(12) United States Patent
Bowen et al.

(10) Patent No.: US 10,922,851 B2
(45) Date of Patent: Feb. 16, 2021

(54) VIRTUAL REALITY ENVIRONMENT COLOR AND CONTOUR PROCESSING SYSTEM

(71) Applicant: The Boeing Company, Chicago, IL (US)

(72) Inventors: David William Bowen, Deptford, NJ (US); Anthony Mathew Montalbano, Folsom, PA (US); Jonathan Wayne Gabrys, Downingtown, PA (US); Devin Richard O'Connor, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 14/496,633

(22) Filed: Sep. 25, 2014

(65) Prior Publication Data
US 2016/0093104 A1 Mar. 31, 2016

(51) Int. Cl.
*G06T 11/00* (2006.01)
*G06T 19/20* (2011.01)

(52) U.S. Cl.
CPC ............ *G06T 11/001* (2013.01); *G06T 19/20* (2013.01); *G06T 2219/2012* (2013.01); *G06T 2219/2021* (2013.01)

(58) Field of Classification Search
None
See application file for complete search history.

(56) References Cited

U.S. PATENT DOCUMENTS 6,146,277 A * 11/2000 Ikeda ...................... A63F 13/10
463/43
6,823,266 B2 * 11/2004 Czernuszenko ......... G01V 1/30
702/14

(Continued)

FOREIGN PATENT DOCUMENTS

| EP | 865000 A2 | 9/1998 |
|----|-----------|--------|
| WO | WO2007112486 A1 | 10/2007 |
| WO | WO2010029553 A1 | 3/2010 |

OTHER PUBLICATIONS

Christian Laugier, C' esar Mendoza, and Kenneth Sundaraj "Towards a Realistic Medical Simulator using Virtual Environments and Haptic Interaction", Robotics Research Volume 6 of the series Springer Tracts in Advanced Robotics pp. 289-306, 2003.*

(Continued)

*Primary Examiner* — Sarah Le
(74) *Attorney, Agent, or Firm* — Yee & Associates, P.C.

(57) ABSTRACT

A method and apparatus for generating a virtual reality environment. Data requirements for generating the virtual reality environment are identified. The virtual reality environment includes objects that are displayed on a display system using a group of models defined by a group of standards. Discrete points for the objects are generated from the models based on the data requirements for generating the virtual reality environment for a selected point in time. At least one of color adjustments or contour adjustments is identified for a portion of the discrete points based on the group of standards and the data requirements when adjustments are needed. The discrete points are modified based on at least one of the color adjustments or the contour adjustments identified to form modified discrete points, which enable generating the virtual reality environment with a desired level of accuracy for training.

20 Claims, 10 Drawing Sheets

(56) References Cited

U.S. PATENT DOCUMENTS

| | | | |
|---|---|---|---|
| 7,098,909 B2* | 8/2006 | Hayano | G06T 15/00 345/419 |
| 7,119,817 B1 | 10/2006 | Kawakami | |
| 2008/0170079 A1* | 7/2008 | Ramshaw | G06T 15/005 345/501 |
| 2009/0219379 A1* | 9/2009 | Rossato | H04N 5/272 348/14.01 |
| 2011/0222081 A1* | 9/2011 | Yi | B29C 64/141 358/1.9 |
| 2011/0316845 A1* | 12/2011 | Roberts | G06T 19/006 345/419 |
| 2013/0151787 A1* | 6/2013 | Riguer | G06F 12/0862 711/137 |
| 2013/0286004 A1 | 10/2013 | McCulloch et al. | |
| 2014/0225922 A1 | 8/2014 | Sbardella | |
| 2015/0015602 A1* | 1/2015 | Beaudoin | G06T 7/0004 345/619 |
| 2015/0127301 A1* | 5/2015 | Seibold | G06F 17/5018 703/1 |

OTHER PUBLICATIONS

Laugier, Christian, César Mendoza, and Kenneth Sundaraj. "Towards a realistic medical simulator using virtual environments and haptic interaction." Robotics Research. Springer Berlin Heidelberg, 2003. 289-306.*

Dutağaci, Helin, Bülent Sankur, and Yücel Yennez., "Subspace methods for retrieval of general 3D models." Computer Vision and Image Understanding 114.8 (2010): 865-886 (Year: 2010).*

United Kingdom Intellectual Property Office Examination Report, dated Jan. 28, 2016, regarding Application No. GB1514599.6, 2 pages.

United Kingdom Intellectual Property Office Examination Report, dated Oct. 29, 2019, regarding Application No. GB1514599.8, 5 pages.

* cited by examiner

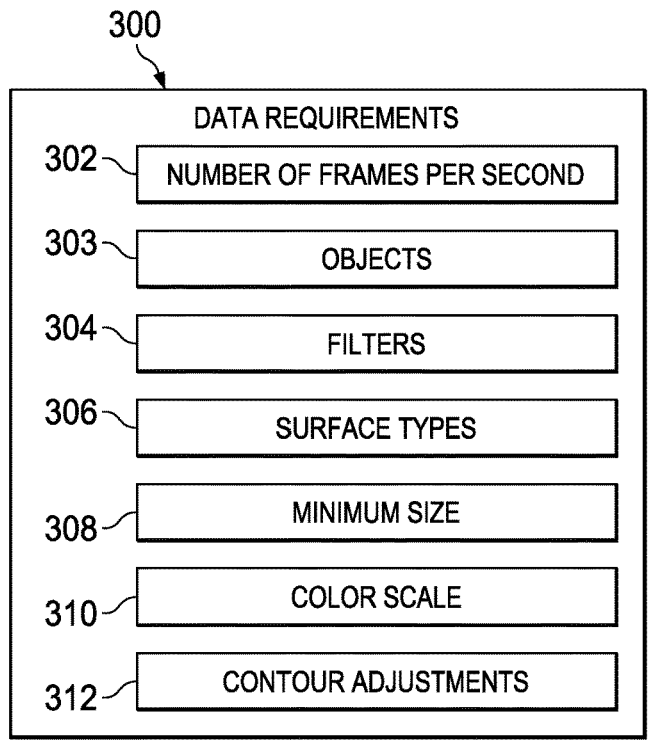
FIG. 3
| TABLE FOR SCRIPTS | | | | | |
|---|---|---|---|---|---|
| SCRIPT TYPES | STANDARD-A | OBJECT-A | STANDARD-B | OBJECT-B |
| COLOR PROCESSING | SCRIPT-A | | SCRIPT-B | |
| CONTOUR-A | | SCRIPT-C | | |
| CONTOUR-B | | | | SCRIPT-D |
FIG. 4
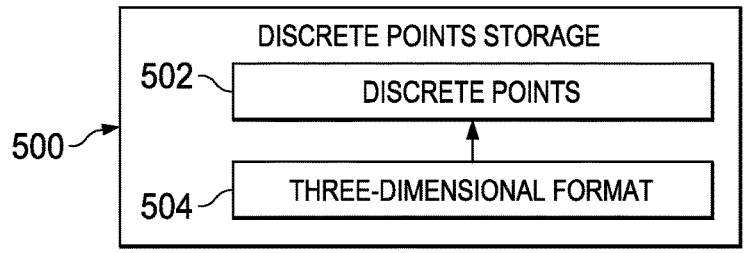
FIG. 5

VIRTUAL REALITY ENVIRONMENT COLOR AND CONTOUR PROCESSING SYSTEM

BACKGROUND INFORMATION

1. Field

The present disclosure relates generally to training with virtual reality environments and, in particular, to displaying objects for virtual reality environments. Still more particularly, the present disclosure relates to a method, apparatus, and system for processing color and contour of objects for a virtual reality environment.

2. Background

Virtual reality environments are computer-simulated environments. Virtual reality environments may represent both real and fictional, or imagined, places.

Virtual reality environments may be used for training purposes. For example, virtual reality environments are used in training people to operate equipment such as vehicles. For example, a virtual reality environment may be used to simulate flying an aircraft, operating a crane, flying a spacecraft, or operating some other type of vehicle.

For example, a pilot may fly an aircraft in a virtual reality environment. This type of training allows the pilot to log hours of simulated flight for a particular type of aircraft under various types of weather conditions, landing at different airports, and for other types of activities for which training is desired.

In this manner, an operator may gain experience with a vehicle. As a result, training may be performed with a lower cost. For example, with training in actual physical vehicles, the availability of the vehicles may limit training. Further, the cost to operate these vehicles also may increase the cost of training. Thus, the use of virtual reality environments may allow more operators to be trained at lower costs and more quickly as compared to using physical vehicles.

Creators of virtual reality environments may add objects to the virtual reality environments for different particular simulations of a real-world environment. For example, if the virtual reality environment is used to train an operator to fly an aircraft, the creators of the virtual reality environment may add different aircraft that may be encountered in the virtual reality environment. As another example, the creators may add buildings, trees, roads, or other suitable types of objects for the virtual reality environment.

However, many of these objects may not be designed for use in virtual reality environments without modification. For example, some objects may be defined in a format that is not supported by the virtual reality environment. As another example, the creators of the virtual reality environment may want to make color or contour changes to objects before using the objects in the virtual reality environment.

In adding an object to a virtual reality environment, the object may require various types of graphical processing tasks to be performed on the object before the object is added to the virtual reality environment. For example, some objects may be defined using colors that do not match the colors desired for the objects in the virtual reality environment. In one example, an object being added to the virtual reality environment may be an aircraft that is defined with shades of red. The creator may want to change the shades of red of the aircraft to another shade of another color more suitable for use in the virtual reality environment. The selection of the color may be to make the object seem more real in the virtual reality environment. Modifying the colors of the objects can be a time consuming and tedious task for operators.

Changes to contours of the objects may be performed for objects of the virtual reality environment. For example, changes may be made to contours of an object to provide increased accuracy in the representation of the object in the virtual reality environment. For example, when damage to an object is required for a simulation, some contours of the object may be modified. This type of modification of contours for an object may be more time consuming and tedious than desired. The time and effort increases as the number of objects that are to be used in a virtual reality environment increase.

Further, an object used in a virtual reality environment may be a large and complex object. In other words, the size of the object in the number of features may increase the amount of time and effort needed to make desired changes to the color and contour of an object. The amount of time and effort needed to make the desired changes may vary widely. For example, while some changes may take an hour or so to complete, other changes may take as much as 6 hours, and still others may take as much as a day or even more to complete.

As a result, the amount of time and effort required for operators to correct color and contour of objects used in a virtual reality environment may not be as fast or as easy to generate as desired. Therefore, it would be desirable to have a method and apparatus that take into account at least some of the issues discussed above, as well as other possible issues.

SUMMARY

In one illustrative embodiment, a method for generating a virtual reality environment is presented. Data requirements for generating the virtual reality environment are identified. The virtual reality environment includes a group of objects that are displayed on a display system using a group of models defined by a group of standards. Discrete points for the group of objects are generated from the group of models based on the data requirements for generating the virtual reality environment for a selected point in time. At least one of a group of color adjustments or a group of contour adjustments is identified for a portion of the discrete points based on the group of standards for the group of models for the group of objects and the data requirements when at least one of the group of color adjustments or the group of contour adjustments is needed for the portion of the discrete points for the selected point in time. The discrete points are modified based on at least one of the group of color adjustments or the group of contour adjustments identified to form modified discrete points. The modified discrete points enable generating the virtual reality environment with a desired level of accuracy for training in a selected environment using the virtual reality environment.

In another illustrative embodiment, an apparatus comprises a virtual reality generator that identifies data requirements for generating a virtual reality environment. The virtual reality environment includes a group of objects that are displayed on a display system using a group of models defined by a group of standards. The virtual reality generator also generates discrete points for the group of objects from the group of models based on the data requirements for generating the virtual reality environment for a selected point in time. Further, the virtual reality generator identifies at least one of a group of color adjustments or a group of contour adjustments for a portion of the discrete points based on the group of standards for the group of models for the group of objects and the data requirements when at least one of the group of color adjustments or the group of contour adjustments is needed for the portion of the discrete points for the selected point in time. Still further, the virtual reality generator modifies the discrete points based on at least one of the group of color adjustments or the group of contour adjustments identified to form modified discrete points. The modified discrete points enable generating the virtual reality environment with a desired level of accuracy for training in a selected environment using the virtual reality environment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a block diagram of data requirements in accordance with an illustrative embodiment;

FIG. 4 is an illustration of a table for scripts in accordance with an illustrative embodiment;

FIG. 5 is an illustration of a block diagram of storage for discrete points in accordance with an illustrative embodiment;

DETAILED DESCRIPTION

Figure 1:
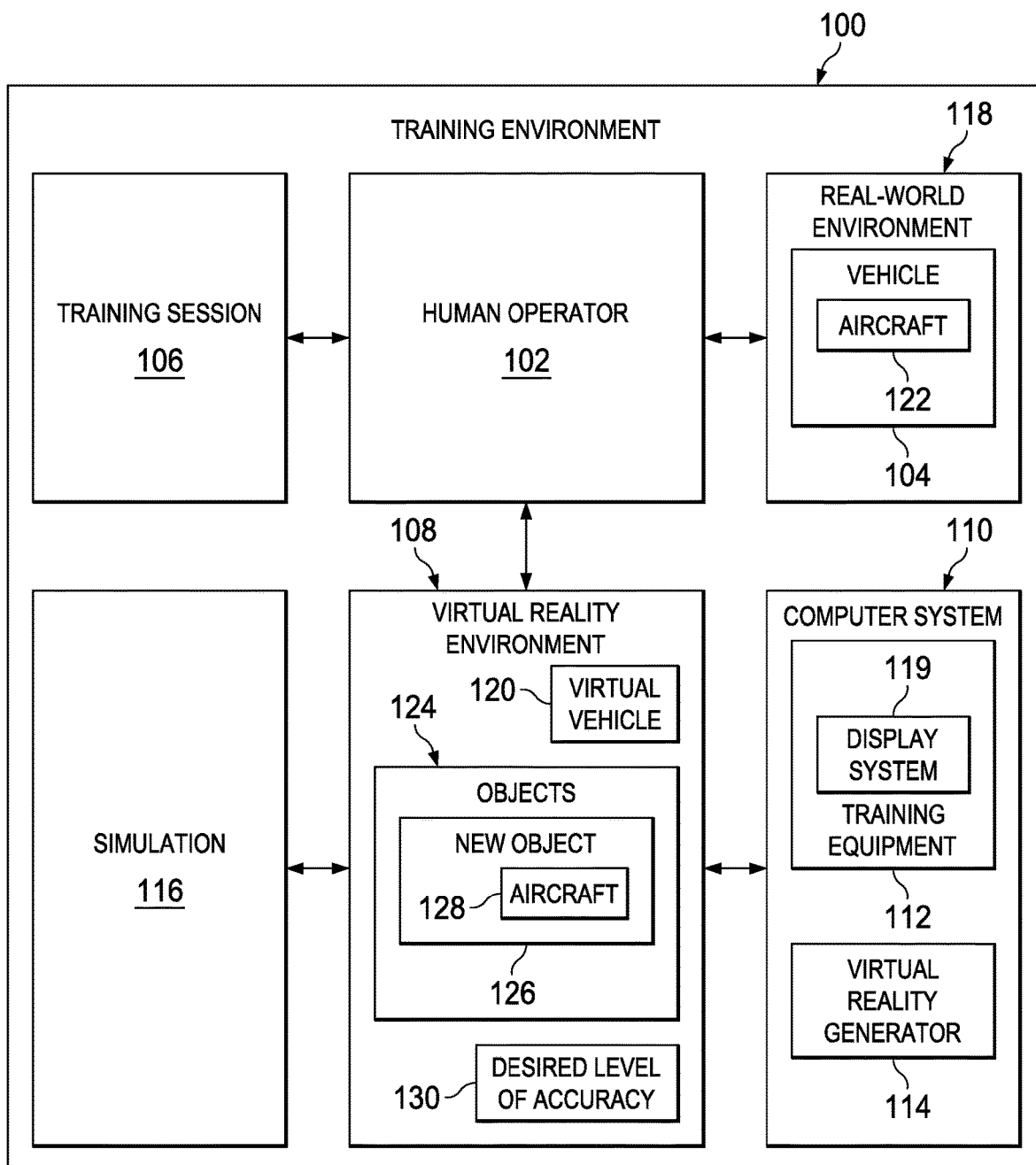
FIG. 1 is an illustration of a block diagram of a training environment in accordance with an illustrative embodiment.

The illustrative embodiments recognize and take into account one or more different considerations. For example, the illustrative embodiments recognize and take into account that changes to a model from one format to another may be performed to provide a desired level of performance for use in a virtual reality environment.

The illustrative embodiments recognize and take into account that objects are displayed over time in displays of the virtual reality environments. The rate at which the display of the objects change in a simulation is known as frames per second. As the number of frames per second of a simulation increase, the realism of the simulation provided by the virtual reality environment also increases. When the number of frames per second of a simulation goes lower than a desired number of frames per second, the level of realism may become unacceptable.

The illustrative embodiments recognize and take into account that making color and contour changes involves a processor and other resources in a computer system. The illustrative embodiments recognize and take into account that these color and contour changes that occur during the simulation are provided by the virtual reality environment. In other words, the illustrative embodiments recognize and take into account that color changes, contour changes, or both may occur while displaying the object over time in the virtual reality environment.

The illustrative embodiments recognize and take into account that the resources used to form color changes and contour changes increase with the number, size, and complexity of objects being used, as well as the desired number of frames per second. As a result, the illustrative embodiments recognize and take into account that the amount of resources needed for performing changes to color and contour may exceed the amount of resources available for presenting the virtual reality environment.

The illustrative embodiments recognize and take into account that creators of virtual reality environments can make color changes and contour changes ahead of time for a virtual reality environment. However, the time and effort needed to make color changes and contour changes makes performing these changes for a training session infeasible. In other words, the color changes and the contour changes may not be made as quickly as desired to add an object to a virtual reality environment while the virtual reality environment is running or within some suitable amount of time to be used in a particular training session.

The illustrative embodiments recognize and take into account that a significant amount of time may pass before the creators have made desired color changes and contour changes to the objects being used in the virtual reality environments. As a result, decreased flexibility in training may occur. Thus, in addition to the issues discussed above, the illustrative embodiments recognize and take into account that it would be desirable to solve a technical problem of converting models and data into a format for a virtual reality environment with a reduced amount of time as compared to currently used processes.

As one solution to this technical problem, the illustrative embodiments provide a method and apparatus for generating a virtual reality environment. In one illustrative embodiment, a virtual reality environment is generated. The process identifies data requirements for generating the virtual reality environment. The virtual reality environment includes a group of objects that are displayed on a display system using models defined by a group of standards.

The process generates discrete points for the objects from the models based on the data requirements for generating the virtual reality environment for a selected point in time. The process also identifies at least one of a group of color adjustments or a group of contour adjustments for a portion of the discrete points based on the group of standards for the models of the objects and the data requirements when at least one of the group of color adjustments or the group of contour adjustments is needed for the portion of the discrete points for the selected point in time. The discrete points are based on the group of color adjustments or contour adjustments identified to form modified discrete points. The modified discrete points enable generating the virtual reality environment with a desired level of accuracy for training in a selected environment using the virtual reality environment.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As used herein, "a group of," when used with reference to items means one or more items. For example, a group of objects is one or more objects.

With reference now to the figures, and in particular, with reference to FIG. 1, an illustration of a block diagram of a training environment is depicted in accordance with an illustrative embodiment. In this example, training environment 100 is used to train human operator 102 to use vehicle 104.

In this illustrative example, human operator 102 may perform training during training session 106 using virtual reality environment 108. Virtual reality environment 108 is an immersive environment that may use multiple types of media. For example, virtual reality environment 108 may include sensory experiences including at least one of sight, smell, sound, touch, and other suitable sensory experiences. As depicted, virtual reality environment 108 may be generated using computer system 110.

In this illustrative example, computer system 110 is a group of computers. When more than one computer is present in computer system 110, those computers may be in communication with each other using a communications medium. For example, the communications medium may be a network or other suitable medium. These computers may be located in part of training equipment 112 in computer system 110. For example, training equipment 112 may include a computer, a flight simulator, a server computer, or other suitable type of equipment that may be used in training session 106.

In this illustrative example, virtual reality generator 114 generates virtual reality environment 108. Virtual reality environment 108 is simulation 116 of real-world environment 118. In this illustrative example, simulation 116 is a computer generated representation of real-world environment 118 for training session 106.

Virtual reality generator 114 may be implemented in software, hardware, firmware or a combination thereof. When software is used, the operations performed by virtual reality generator 114 may be implemented in program code configured to run on hardware, such as a processor unit. When firmware is used, the operations performed by virtual reality generator 114 may be implemented in program code and data and stored in persistent memory to run on a processor unit. When hardware is employed, the hardware may include circuits that operate to perform the operations in virtual reality generator 114.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, virtual reality generator 114 may be implemented in computer system 110. In this illustrative example, virtual reality generator 114 represents virtual reality environment 108 to human operator 102 using display system 119 in computer system 110. Display system 119 is located in training equipment 112.

In this illustrative example, display system 119 is a group of display devices. A display device in display system 119 may include a device selected from one of a liquid crystal display (LCD), a stereoscopic display, a head-mounted display device, virtual reality goggles, and other suitable types of display devices.

In this illustrative example, virtual vehicle 120 is present in virtual reality environment 108. Virtual vehicle 120 is a representation of vehicle 104 in real-world environment 118 for which human operator 102 receives training during training session 106. As depicted, in this particular example, vehicle 104 is aircraft 122 and virtual vehicle 120 is a representation of aircraft 122 in virtual reality environment 108.

In these illustrative examples, virtual reality generator 114 also generates a group of objects 124 for virtual reality environment 108. The group of objects 124 are items displayed in virtual reality environment 108. As depicted, the group of objects 124 may be at least one of a vehicle, an aircraft, a car, a train, a radio tower, a mountain, a tree, a building, a road, or other suitable types of objects that may be encountered during training session 106.

In these illustrative examples, it may be desirable to make changes to virtual reality environment 108 during training session 106. These changes may occur while virtual reality environment 108 continues to be presented to human operator 102. In other illustrative examples, the changes may be made after stopping virtual reality environment 108, making the changes and restarting virtual reality environment 108 during training session 106. In other words, the changes may be made and used during training session 106 without requiring an undesired break in training for human operator 102.

For example, the group of objects 124 may be altered to include new object 126. New object 126 may be, for example, aircraft 128. In other examples, new object 126 may take other forms, such as, for example, a building, a truck, a train, a dam, or some other suitable type of object for addition to virtual reality environment 108.

The illustrative embodiments recognize and take into account that adding aircraft 128 to the group of objects 124 in virtual reality environment 108 may often be infeasible with currently used techniques for generating virtual reality environment 108. With currently used techniques, a technical problem may be present when adding aircraft 128 to virtual reality environment 108 with desired level of accuracy 130. In this illustrative example, desired level of accuracy 130 is when aircraft 128, representing a real-world version of an aircraft, is displayed accurately as desired when viewed in virtual reality environment 108 by human operator 102.

One or more of the illustrative examples provide a technical solution to this problem and provide a higher level of speed in providing desired level of accuracy 130 for new object 126 as compared to currently used techniques. One or more of the illustrative examples also may be implemented in virtual reality generator 114 to add new object 126 to virtual reality environment 108 with desired level of accuracy 130 while virtual reality environment 108 is running during training session 106. Desired level of accuracy 130 is how realistic virtual reality environment 108 should be for performing training during training session 106. Desired level of accuracy 130 may be based on, for example, at least one of how frequently objects are displayed, correctness of colors used for objects, inclusion of contour adjustments, or other suitable requirements for objects displayed in virtual reality environment 108. In other illustrative examples, new object 126 may be added in between running virtual reality environment 108 such that training of human operator 102 is not impacted in an undesired manner.

Figure 2:
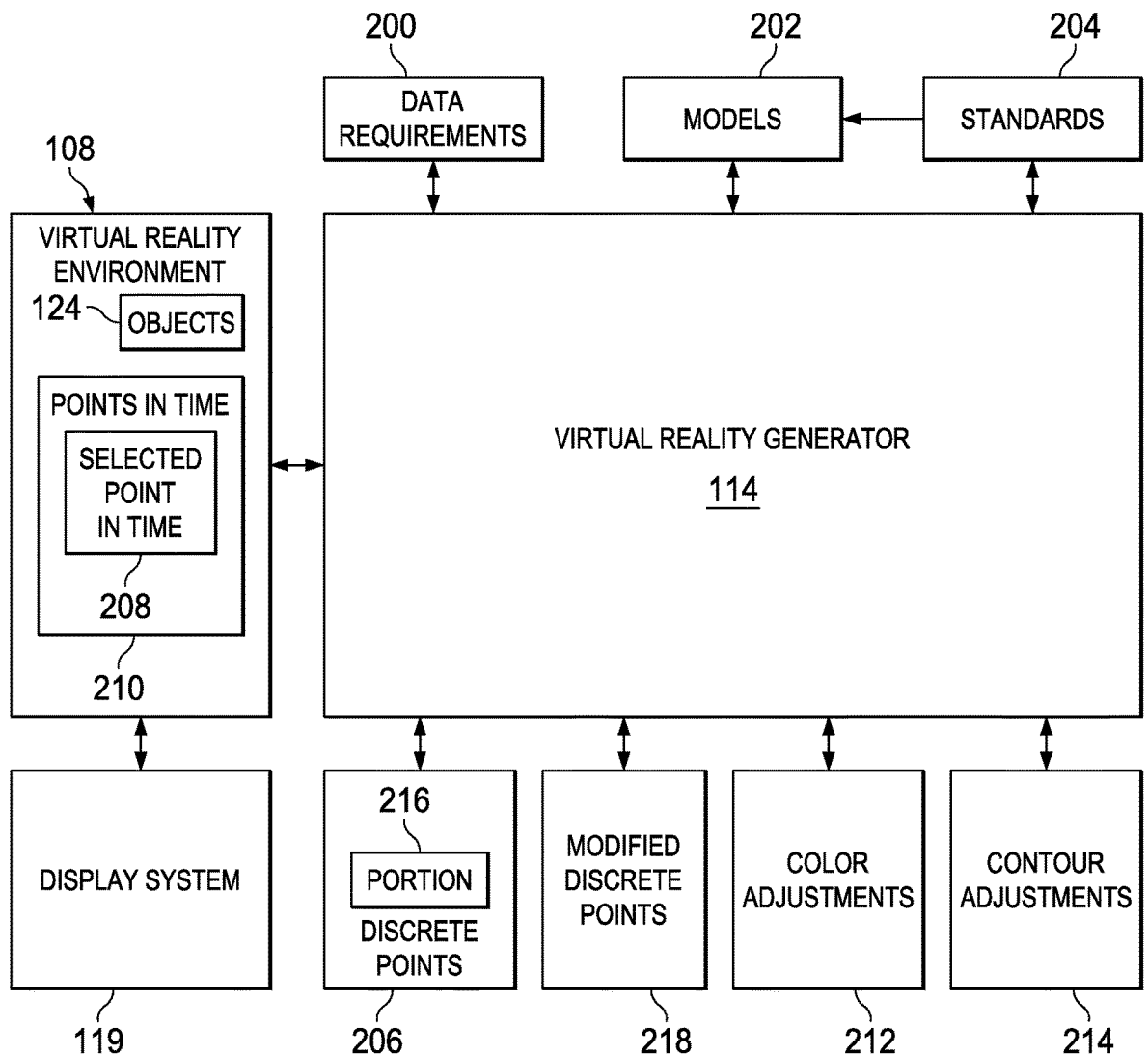
FIG. 2 is an illustration of adding objects to a virtual reality environment in the form of a block diagram in accordance with an illustrative embodiment.

One illustrative example for adding new object 126 with desired level of accuracy 130 is described in FIG. 2 below. With reference to FIG. 2, an illustration of adding objects to a virtual reality environment is depicted in the form of a block diagram in accordance with an illustrative embodiment. In this illustrative example, virtual reality generator 114 controls the use of the group of objects 124 in virtual reality environment 108 in generating virtual reality environment 108.

In the illustrative examples, the same reference numeral may be used in more than one figure. This reuse of the reference numeral in different figures represents the same element being present in the different figures. For example, virtual reality generator 114 is shown in both FIG. 1 and FIG. 2. In FIG. 2, virtual reality generator 114 is the same element as virtual reality generator 114 shown in in FIG. 1.

As depicted, virtual reality generator 114 identifies data requirements 200 for generating virtual reality environment 108. In this illustrative example, data requirements 200 are requirements for generating discrete points for the group of objects 124. Data requirements 200 may state what is needed in generating the discrete points. Data requirements 200 may result in at least one of a group of color adjustments or a group of contour adjustments that occur in generating the discrete points. One illustrative example of data requirements 200 for generating discrete points is described in FIG. 3 below.

In the illustrative example, virtual reality environment 108 includes a group of objects 124 that are displayed on display system 119 in FIG. 1 using a group of models 202. In this illustrative example, a model for an object in the group of models 202 is a definition of the shape of the object. As depicted, models 202 may be computer aided design (CAD) models or other types of models used by design programs on computers.

In this example, the group of models 202 is defined by a group of standards 204. In this illustrative example, a standard in the group of standards 204 is a definition for how a model specifies the shape of an object.

Computer aided design standards use continuous geometry to define portions of objects. Continuous geometry is a geometric object selected from at least one of cubes, circles, spheres, cones, rectangles, triangles, or other suitable types of geometric objects. In this illustrative example, the group of standards 204 include at least one of a type of computer aided design (CAD), or other suitable types of standards for models 202.

Virtual reality generator 114 generates discrete points 206 for the group of objects 124 from the group of models 202 based on data requirements 200 for generating virtual reality environment 108 for selected point in time 208. Discrete points 206 for an object are points in space that represent the object in this illustrative example. Discrete points 206 are defined by at least one of x, y, and z coordinates, vector coordinates, or other suitable means for representing the object in virtual reality environment 108. For example, discrete points 206 for an object in the group of objects 124 may be in a format suitable for displaying the object as pixels on display system 119 in virtual reality environment 108. For example, when a mesh is used in virtual reality environment 108, discrete points 206 for the group of objects 124 may represent points used to form the mesh in virtual reality environment 108. Discrete points 206 for objects are sometimes referred to as discrete points of data for the objects. Discrete points of data may be referred to as finite element method (FEM) data.

In this illustrative example, selected point in time 208 is a point in time in points in time 210 for virtual reality environment 108. As used herein, points in time 210 is the times at which the group of objects 124 are displayed. In other words, virtual reality environment 108 is presented to human operator 102 in FIG. 1 over points in time 210.

As depicted, virtual reality environment 108 is not static and dynamic changes occur over points in time 210 in this illustrative example. In this illustrative example, virtual reality generator 114 identifies at least one of a group of color adjustments 212 or a group of contour adjustments 214 for portion 216 of discrete points 206 based on the group of standards 204 for the group of models 202 for the group of objects 124 and data requirements 200.

In this illustrative example, the group of color adjustments 212 is one or more changes to color used for the group of objects 124. For example, the group of color adjustments 212 may include corrections for a scale of colors used for discrete points 206 for the group of objects 124. A scale of colors is a range of color values. Correcting the scale of colors used for discrete points for an object means modifying a range of color values used for the discrete points. The range of color values are at least one of red, green, and blue (RBG) values, cyan, magenta, yellow, and key (CMYK)

values, or other suitable types of color values. A scale of colors is sometimes referred to as a color scale.

In this illustrative example, the group of contour adjustments 214 changes the shape of the group of objects 124. Contour adjustments 214 may include one or more changes to locations of discrete points 206 for the group of objects 124. For example, when simulating damage of impact, a contour adjustment for the object at the point of impact on the object may define how to modify locations of the discrete points for the simulation to change the shape of the object to simulate damage caused by the impact.

In this illustrative example, at least one of the group of color adjustments 212 or the group of contour adjustments 214 are selected by at least one of human operators, training equipment, a virtual reality environment, or a combination thereof. This identification of at least one of a group of color adjustments 212 or a group of contour adjustments 214 is made by virtual reality generator 114 when at least one of the group of color adjustments 212 or the group of contour adjustments 214 is needed for portion 216 of discrete points 206 for selected point in time 208.

Next, virtual reality generator 114 modifies discrete points 206 based on at least one of the group of color adjustments 212 or the group of contour adjustments 214 identified to form modified discrete points 218. In this illustrative example, modified discrete points 218 may be stored in a three-dimensional format. As a result, modified discrete points 218 enable generating virtual reality environment 108 with desired level of accuracy 130 in FIG. 1 for training in a selected environment using virtual reality environment 108. The selected environment may be any environment that is desired for training human operator 102.

In this illustrative example, modified discrete points 218 are made available for use in virtual reality environment 108 when selected point in time 208 arrives for presenting the group of objects 124. For example, modified discrete points 218 may be generated ahead of time and stored in memory or some other suitable type of computer readable storage device.

As another example, modified discrete points 218 may be generated substantially in real time as the group of objects are being presented in virtual reality environment 108. The generating of modified discrete points 218 may be performed by resources separate from resources used in a training environment to improve the number of frames per second that the training environment can display of the group of objects with at least one of the group of color adjustments 212 or the group of contour adjustments 214. Thus, the training of a human operator is not impacted in an undesired manner when virtual reality generator 114 makes at least one of the group of color adjustments 212 or the group of contour adjustments 214.

With reference next to FIG. 3, an illustration of a block diagram of data requirements is depicted in accordance with an illustrative embodiment. As depicted, data requirements 300 are an example of data requirements 200 in FIG. 2.

In this illustrative example, data requirements 300 include a number of different fields. As depicted, data requirements 300 includes number of frames per second 302, a group of objects 303, a group of filters 304, a group of surface types 306, minimum size 308, color scale 310, and a group of contour adjustments 312.

As depicted, the group of objects 303 is an example of the group of objects 124 in FIG. 1 and FIG. 2. In the illustrative example, number of frames per second 302 is the rate at which changes to the group of objects 303 is being displayed in a virtual reality environment.

For example, number of frames per second 302 may be selected between about 60 frames per second and about 150 frames per second. In this example, number of frames per second 302 may indicate the amount of time available for a virtual reality generator to produce modified discrete points for the group of objects. Dividing the number one by number of frames per second 302 gives the amount of time between each frame being displayed in the virtual reality environment. When the virtual reality generator generates the modified discrete points in real time for the virtual reality environment, the modified discrete points are generated before the amount of time between frames has passed.

As another example, number of frames per second 302 may also indicate the number of frames in which the group of contour adjustments 312 is to take place. For example, when simulating damage of an impact event, a contour adjustment may include a number of different modifications to discrete points over a defined amount of time. In this example, the virtual reality environment uses the number of frames per second 302 to distribute the number of different modifications over the defined amount of time for the impact event.

The group of filters 304 are identifiers of visible portions of the group of objects 303 in this illustrative example. For example, the group of filters 304 may include named parts of objects, named assemblies of objects, or other suitable types of identifiers of visible portions of the group of objects 303. A named part of an object is a portion the object that can be displayed in the virtual reality environment. A named assembly is a group of parts that can be displayed in the virtual reality environment. For example, a named assembly of an aircraft may include the interior of the aircraft. In this example, the interior of the aircraft may include seats, flight instruments, and other suitable parts for the interior of an aircraft. When the group of filters 304 includes a filter for an interior assembly of an aircraft, the filter identifies whether parts for the interior assembly for the aircraft are displayed in the virtual reality environment.

In this illustrative example, the group of surface types 306 define the format of surfaces used for the group of objects 303 in a virtual reality environment. For example, the group of surface types 306 may be selected from at least one of meshed, vector, or other suitable formats for an object in the virtual reality environment. For example, when a meshed format is selected for an object, discrete points are used to represent points in the virtual reality environment for the object. When a vector format is selected for an object, continuous geometry is used to represent the object in the virtual reality environment.

As depicted, minimum size 308 is the smallest portion of the group of objects 303 that will be displayed on a surface of an object. In this illustrative example, minimum size 308 is defined in units of measurement selected from at least one of volume, surface area, bounding box extent, or other suitable types of units of measurement. In this illustrative example, bounding box extent is the longest dimension of the smallest box that can contain a geometric object.

For example, when minimum size 308 is defined as bounding box extent, minimum size 308 may be compared to bounding boxes for geometric objects defined by models for the group of objects 303. In this example, when a bounding box extent for a geometric object is less than minimum size 308, a virtual reality generator may identify the geometric object as a portion of the group of objects 303 that will not be displayed.

In this illustrative example, color scale 310 is the range of colors needed for the group of objects 303. For example, the range of colors may be a group of continuous ranges of colors. For example, a virtual reality generator may identify a group of color adjustments based on differences between colors used in a model for the group of objects 303 and color scale 310. The group of contour adjustments 312 is an example of the group of contour adjustments 214 in FIG. 2.

Turning now to FIG. 4, an illustration of a table for scripts is depicted in accordance with an illustrative embodiment. In this illustrative example, scripts in table for scripts 400 are examples of program code that virtual reality generator 114 in FIG. 2 uses to make at least one of the group of color adjustments 212 in FIG. 2 or the group of contour adjustments 214 in FIG. 2 to form modified discrete points 218 in FIG. 2. As used herein, a script for performing an adjustment to form modified discrete points 218 is program code that performs the adjustment.

In the illustrative example, each script in table for scripts 400 is at least one of Java script, tool command language (TCL), or some other suitable type of script. As depicted, table for scripts 400 includes columns for script types, standard-A, object-A, standard-B, and object-B. As depicted, object-A is defined using a model based on standard-A, and object-B is defined using a model based on standard-B.

In the illustrative example, the script types are shown as rows in table for scripts 400. In this illustrative example, the script types include color processing scripts, contour-A scripts, and contour-B scripts.

As depicted, a virtual reality generator may select a script in table for scripts 400 for processing at least one of a group of color adjustments or a group of contour adjustments. For example, script-C is identified in table for scripts 400 for modifying discrete points of object-A to include contour-A.

In this illustrative example, rules may be used to select scripts from table for scripts 400. For example, a rule for inheriting scripts from the standard used to define the model of an object may be used to select scripts when a specific script is not uniquely defined for the object in table for scripts 400. For example, to process a group of color adjustments for object-A, the virtual reality generator may use this inheritance rule to select script-A based on object-A being defined by a model based on standard-A.

Turning next to FIG. 5, an illustration of a block diagram of storage for discrete points is depicted in accordance with an illustrative embodiment. In this illustrative example, virtual reality generator 114 in FIG. 2 uses discrete points storage 500 to store at least one of discrete points 206 in FIG. 2 or modified discrete points 218 in FIG. 2.

In this illustrative example, discrete points storage 500 is at least one of a file, a list of discrete points, a table of discrete points, or any other suitable type of data structure for storing discrete points. Discrete points storage 500 may be located in a computer readable storage device in this illustrative example. For example, discrete points storage 500 may be a file in a computer readable storage device of a data processing system.

As depicted, discrete points storage 500 includes discrete points 502. Discrete points 502 is an example of at least one of discrete points 206 in FIG. 2 or modified discrete points 218 in FIG. 2. In this illustrative example, discrete points 502 may be stored in the form of a list, a table, and any other suitable type of data structure for discrete points 502 in a training environment. For example, a virtual reality generator may store discrete points 502 in discrete points storage 500 as rows of a table in a database. As another example, a virtual reality generator may store discrete points 502 in discrete points storage 500 as a list of discrete points 502 in a memory of a data processing system.

In this illustrative example, a virtual reality generator modifies discrete points 502 in discrete points storage 500. In this illustrative example, the virtual reality generator may modify discrete points 502 for at least one of a group of color adjustments or a group of contour adjustments.

As depicted, discrete points 502 are stored using three-dimensional format 504. In this illustrative example, three-dimensional format 504 is a format in which x, y, and z dimensions for discrete points 502 are all represented. Three-dimensional format 504 is at least one of virtual reality modeling (VRML) format, or other suitable formats for discrete points in the virtual reality environments.

Figure 6:
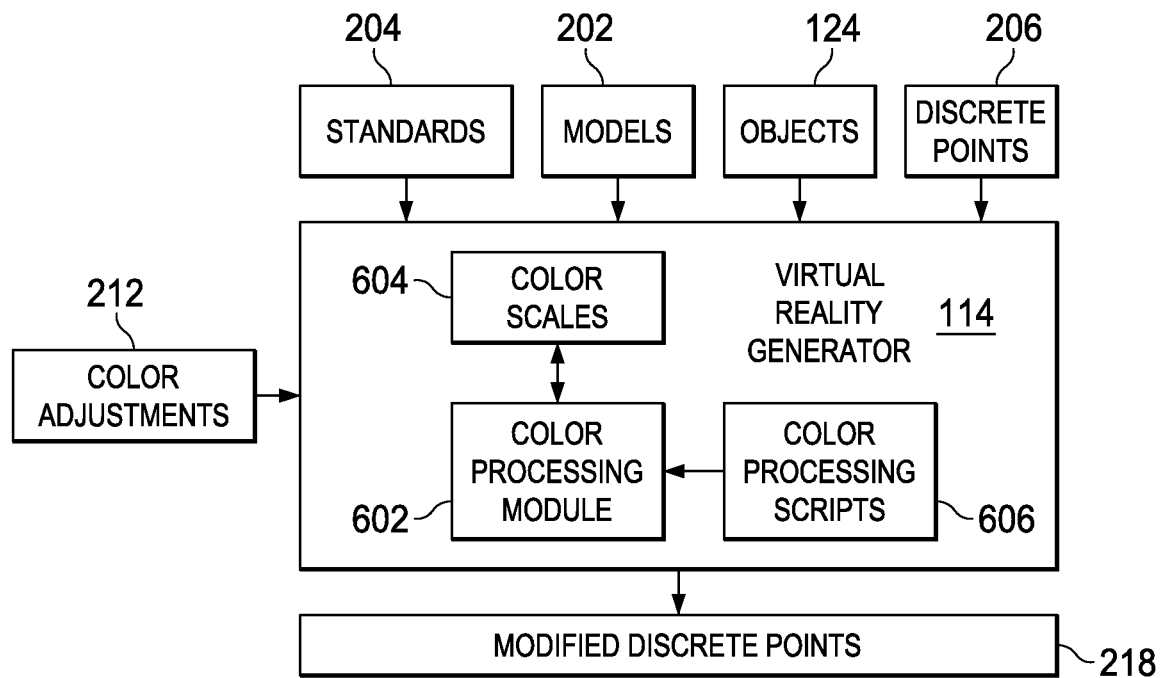
FIG. 6 is an illustration of a block diagram of components of a virtual reality generator in accordance with an illustrative embodiment.

With reference now to FIG. 6, an illustration of a block diagram of components of a virtual reality generator is depicted in accordance with an illustrative embodiment. In this figure, an example of components that may be used in virtual reality generator 114 in FIG. 1 and FIG. 2 is shown.

As depicted, virtual reality generator 114 includes color processing module 602. Color processing module 602 is hardware, software, or a combination of hardware and software that adjusts color of discrete points 206 for the group of objects 124. In this illustrative example, color processing module 602 generates a group of color scales 604 for discrete points 206 for the group of objects 124. For example, color processing module 602 may generate the group of color scales 604 based on at least one of a range of colors used in discrete points 206, or the group of standards 204 for the group of models 202 for the group of objects 124.

In this illustrative example, color processing module 602 identifies a group of color processing scripts 606 for modifying the range of colors used in discrete points 206. For example, color processing module 602 may identify the group of color processing scripts 606 for the group of objects 124 in a table for scripts. As depicted, color processing module 602 runs the group of color processing scripts 606 to make the group of color adjustments 212 to discrete points 206 to form modified discrete points 218.

Figure 7:
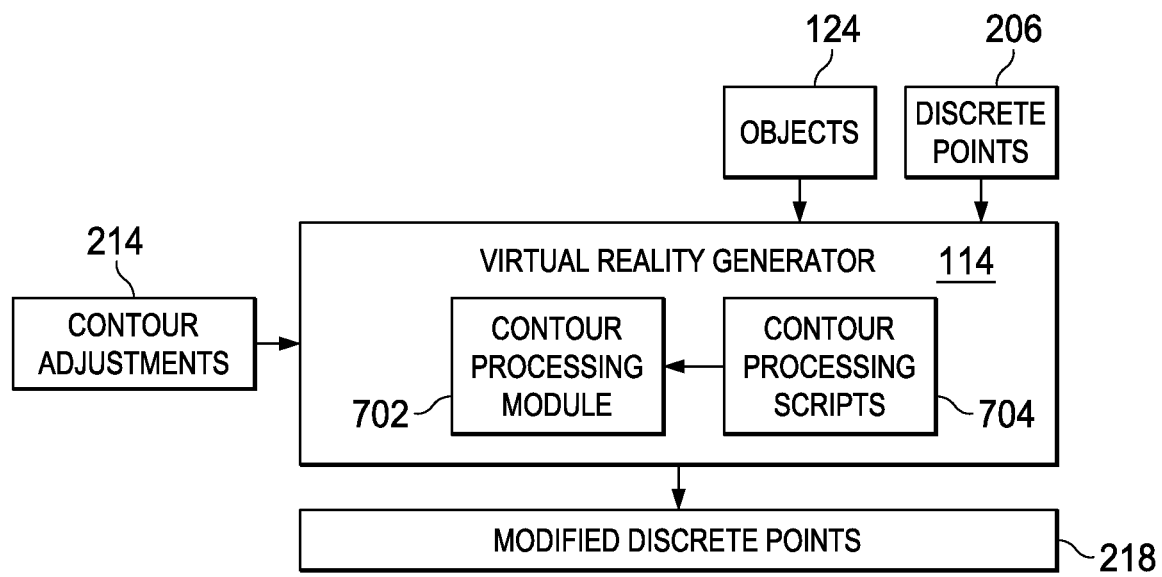
FIG. 7 is an illustration of a block diagram of other components of a virtual reality generator in accordance with an illustrative embodiment.

In FIG. 7, an illustration of a block diagram of other components of a virtual reality generator is depicted in accordance with an illustrative embodiment. In this example, an example of components that may be used in virtual reality generator 114 in FIG. 1 and FIG. 2 is shown.

As depicted, virtual reality generator 114 includes contour processing module 702. Contour processing module 702 is hardware, software, or a combination of hardware and software that adjusts contours of discrete points 206. In this illustrative example, contour processing module 702 identifies a group of contour processing scripts 704 for making the group of contour adjustments 214 to discrete points 206 for the group of objects 124. For example, contour processing module 702 may identify the group of contour processing scripts 704 for the group of objects 124 in a table for scripts. As depicted, contour processing module 702 runs the group of contour processing scripts 704 to make the group of contour adjustments 214 to discrete points 206 to form modified discrete points 218.

Figure 8:
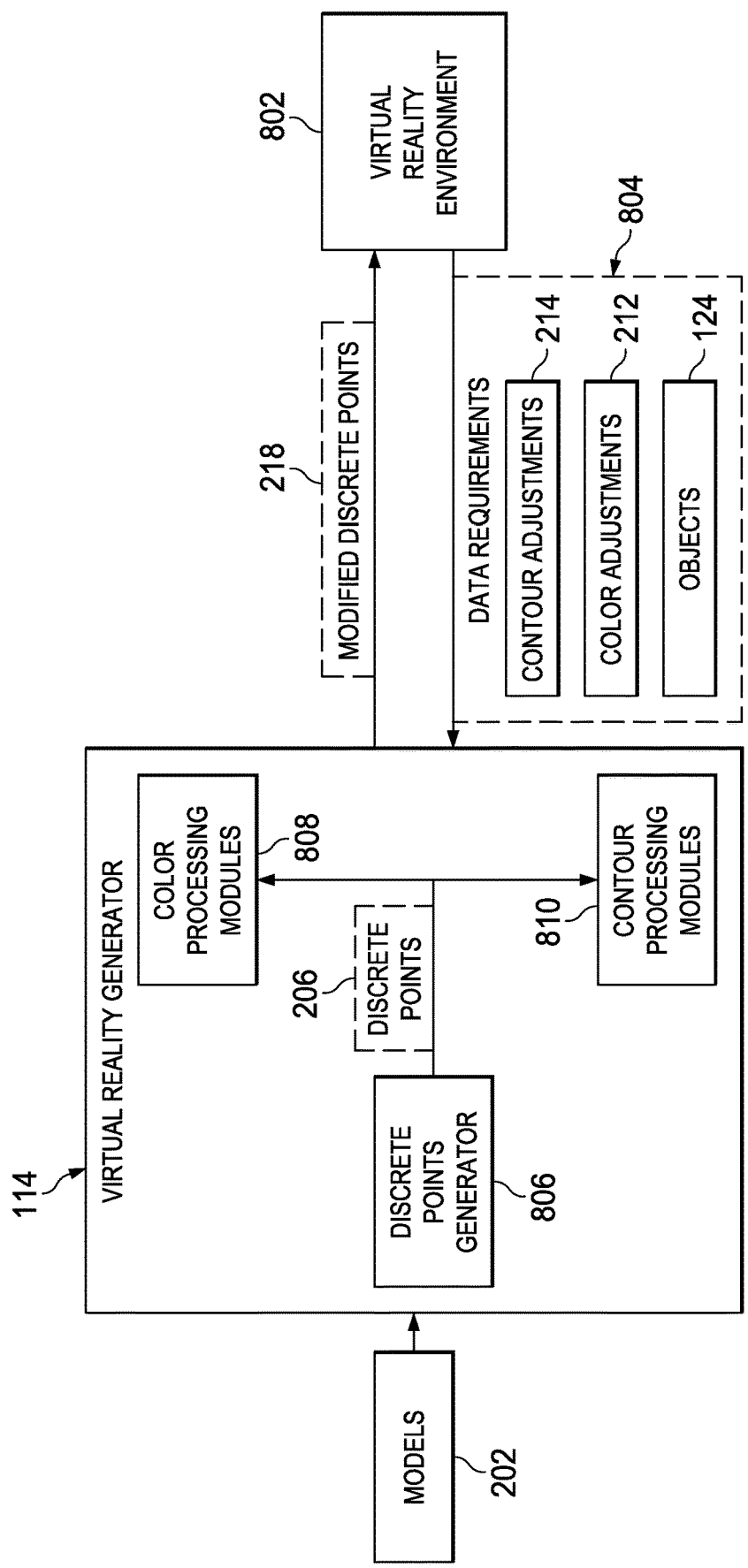
FIG. 8 is an illustration of a block diagram of components in a training environment in accordance with an illustrative embodiment.

With reference to FIG. 8, an illustration of a block diagram of components in a training environment is depicted in accordance with an illustrative embodiment. In this example, an example of components that may be used in virtual reality generator 114 in FIG. 1 and FIG. 2 is shown.

In this illustrative example, virtual reality generator 114 receives data requirements 804 from virtual reality environment 802. Data requirements 804 are an example of data requirements 200 in FIG. 2. In this illustrative example, data requirements 804 includes the group of objects 124, the group of contour adjustments 214, and the group of color adjustments 212.

As depicted, virtual reality generator 114 includes discrete points generator 806, a group of color processing modules 808, and a group of contour processing modules 810. In this illustrative example, discrete points generator 806 generates discrete points 206 for the group of objects 124 from the group of models 202. The group of color processing modules 808 and the group of contour processing modules 810 are at least one of hardware, software, or a combination of hardware and software.

In this illustrative example, virtual reality generator 114 identifies at least one of the group of color processing modules 808 or the group of contour processing modules 810 to make adjustments to discrete points 206. Virtual reality generator 114 uses at least one of group of color processing modules 808 or the group of contour processing modules 810 that are identified to make adjustments to discrete points 206 to form modified discrete points 218. In this illustrative example, virtual reality generator 114 sends modified discrete points 218 to virtual reality environment 802.

The illustration of training environment 100 and the different components in training environment 100 in FIGS. 1-8 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although training environment 100 has been described with virtual reality environment 108 simulating real-world environment 118, other illustrative examples may be applied to fictional or other environments that are not found in the real world. In yet other illustrative examples, training environment 100 may be applied to training with other objects other than vehicle 104. For example, training session 106 may train human operator 102 to use manufacturing equipment, operate a solar power plant, or other suitable types of objects for which training may be desired.

As another example, one or more new objects in place of or in addition to new object 126 may be added to virtual reality environment 108 in FIG. 1 by virtual reality generator 114 in FIG. 1. For example, 3 new objects, 100 new objects, or some other number of new objects may be added to virtual reality environment 108 in FIG. 1.

In still another example, other types of output devices may be used in presenting virtual reality environment 108 in addition to display system 119. For example, speakers, headphones, peptic devices, goggles, wired gloves, and other suitable devices may be used to present virtual reality environment 108 to human operator 102.

Figure 9:
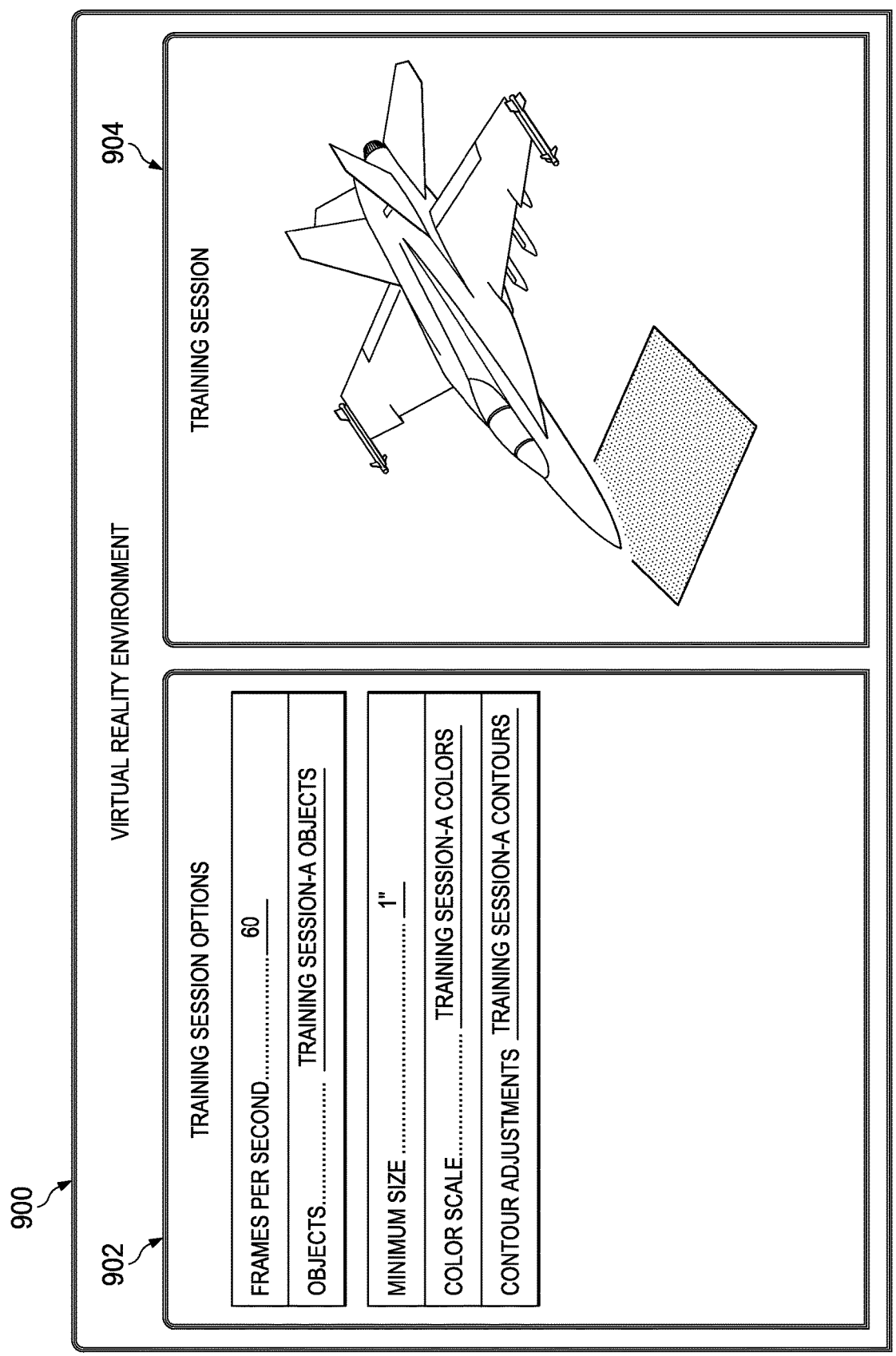
FIG. 9 is an illustration of a graphical user interface of a training environment in accordance with an illustrative embodiment.

With reference next to FIG. 9, an illustration of a graphical user interface of a training environment is depicted in accordance with an illustrative embodiment. As depicted, virtual reality environment 900 is a graphical user interface of a display system for training equipment.

In this illustrative example, virtual reality environment 900 includes training session options 902 and training session 904. Training session 904 is an illustration of an implementation of training session 106 shown in block form in FIG. 1. In particular, training session 904 is an illustrative example of a visualization of training session 106 in FIG. 1.

As depicted, training session options 902 is an example of a window for selecting data requirements. In this illustrative example, training session options 902 are for training session 904. Training session 904 is a window in virtual reality environment 900 that displays a group of objects for a training session, in this illustrative example.

As depicted, training session options 902 includes a number of frames per second, a group of objects, a minimum size for the smallest visible portion of the group of objects, a color scale for the group of objects, and a group of contour adjustments for the group of objects. In this illustrative example, a human operator may provide user input to training session options 902 to make changes to training session 904. The changes made modify training session 904 without requiring an undesired break in training for the human operator.

Figure 10:
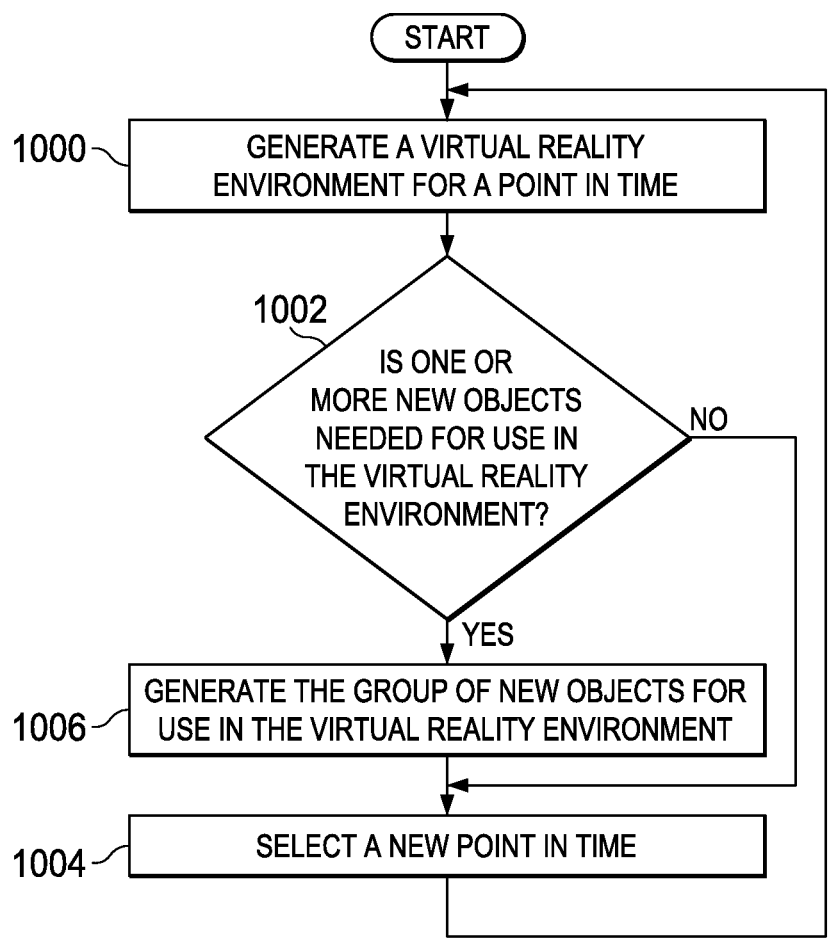
FIG. 10 is an illustration of a flowchart of a process for performing training using a virtual reality environment in accordance with an illustrative embodiment.

Turning now to FIG. 10, an illustration of a flowchart of a process for performing training using a virtual reality environment is depicted in accordance with an illustrative embodiment. The process illustrated in FIG. 10 may be implemented in training environment 100 in FIG. 1 to present virtual reality environment 108 using virtual reality generator 114.

The process begins by generating a virtual reality environment for a point in time (operation 1000). The process then determines whether one or more new objects is needed for use in the virtual reality environment (operation 1002). The determination in operation 1002 may be made through user input selecting a change to the virtual reality environment that includes one or more new objects.

If a group of new objects is not needed in the virtual reality environment, the process selects a new point in time (operation 1004), with the process then returning to operation 1000. Otherwise, the process generates the group of new objects for use in the virtual reality environment (operation 1006), with the process then proceeding to operation 1004.

Figure 11:
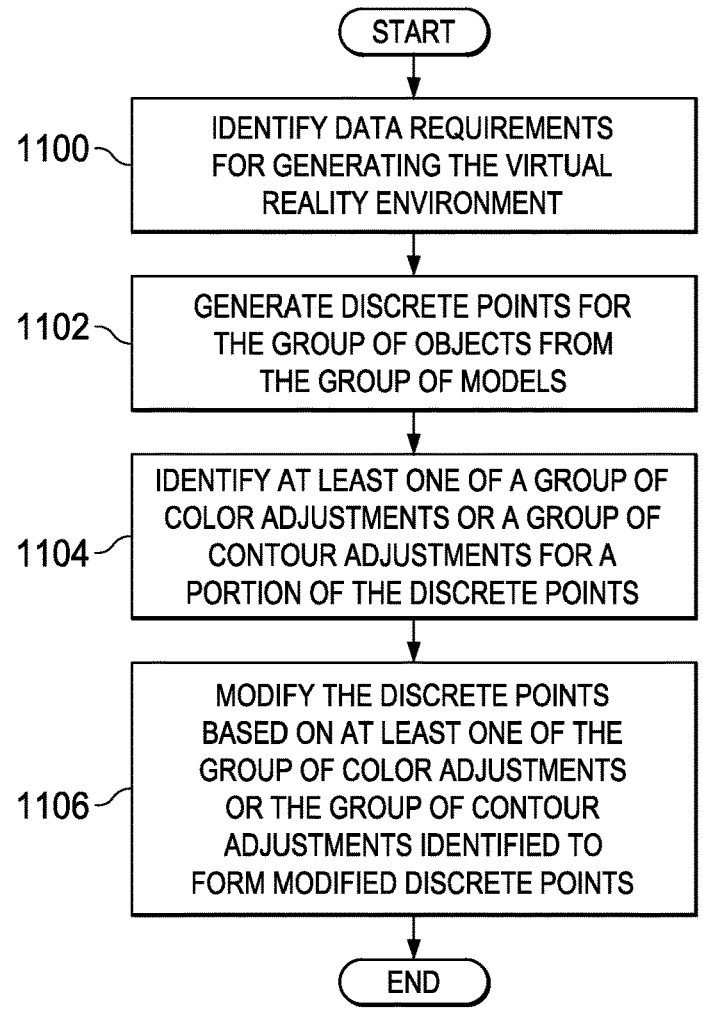
FIG. 11 is an illustration of a flowchart of a process for generating a virtual reality environment in accordance with an illustrative embodiment.

With reference next to FIG. 11, an illustration of a flowchart of a process for generating a virtual reality environment is depicted in accordance with an illustrative embodiment. The process illustrated in FIG. 11 may be implemented in training environment 100 in FIG. 1. In particular, the process may be implemented in virtual reality generator 114 in FIG. 1. Further, this process may be an example of one implementation of operation 1006 in FIG. 10.

The process begins by identifying data requirements for generating the virtual reality environment (operation 1100). The virtual reality environment includes a group of objects that are displayed on a display system using a group of models defined by a group of standards in this illustrative example.

The process generates discrete points for the group of objects from the group of models (operation 1102). In operation 1102, the discrete points are generated based on the data requirements for generating the virtual reality environment for a selected point in time.

The process identifies at least one of a group of color adjustments or a group of contour adjustments for a portion of the discrete points (operation 1104). The identification for the different adjustments is based on the group of standards for the group of models for the group of objects and the data requirements. This identification is performed when at least one of the group of color adjustments or the group of contour adjustments is needed for the portion of the discrete points for the selected point in time.

The process then modifies the discrete points based on at least one of the group of color adjustments or the group of contour adjustments identified to form modified discrete points (operation 1106), with the process terminating thereafter. In operation 1106, the modifying of the discrete points may be formed by assigning a group of graphical processing units to perform the group of color adjustments or the group of contour adjustments needed for the portions of the discrete points.

Each graphical processing unit in the group of graphical processing units is hardware, software, or combination of hardware and software. For example the hardware may be GPU, CPU, or other suitable type of processor unit; and software may be a script executed by the hardware, or some other suitable type of software.

For example, the group of graphical processing units may be a first group of graphical processing units separate from a second group of graphical processing units. In this example, operation 1100 for identifying the data requirements for generating the virtual reality environment may be performed by the second group of graphical processing units that does not include any of the first group of graphical processing units assigned to perform operation 1106.

The modified discrete points enable generating the virtual reality environment with a desired level of accuracy for training in a selected environment using the virtual reality environment. In this manner, training may be performed more efficiently and quickly as compared to currently used techniques.

Figure 12:
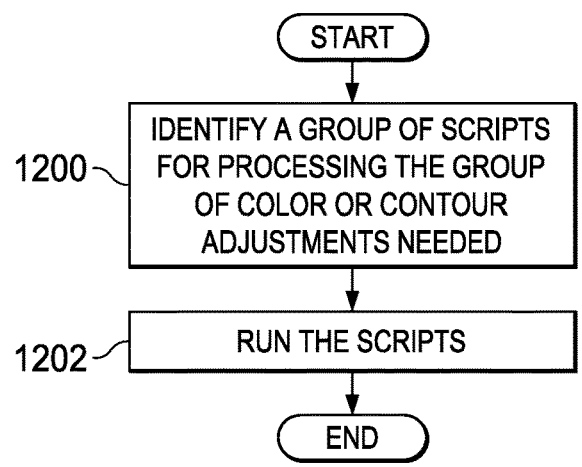
FIG. 12 is an illustration of a flowchart of a process for modifying the discrete points for a group of objects in accordance with an illustrative embodiment.

With reference next to FIG. 12, an illustration of a flowchart of a process for modifying the discrete points for a group of objects is depicted in accordance with an illustrative embodiment. The process illustrated in FIG. 12 is an example of an implementation for operation 1106 in FIG. 11.

The process begins by identifying a group of scripts for processing the group of color or contour adjustments needed (operation 1200). The process then runs the scripts (operation 1202), with the process terminating thereafter.

Figure 13:
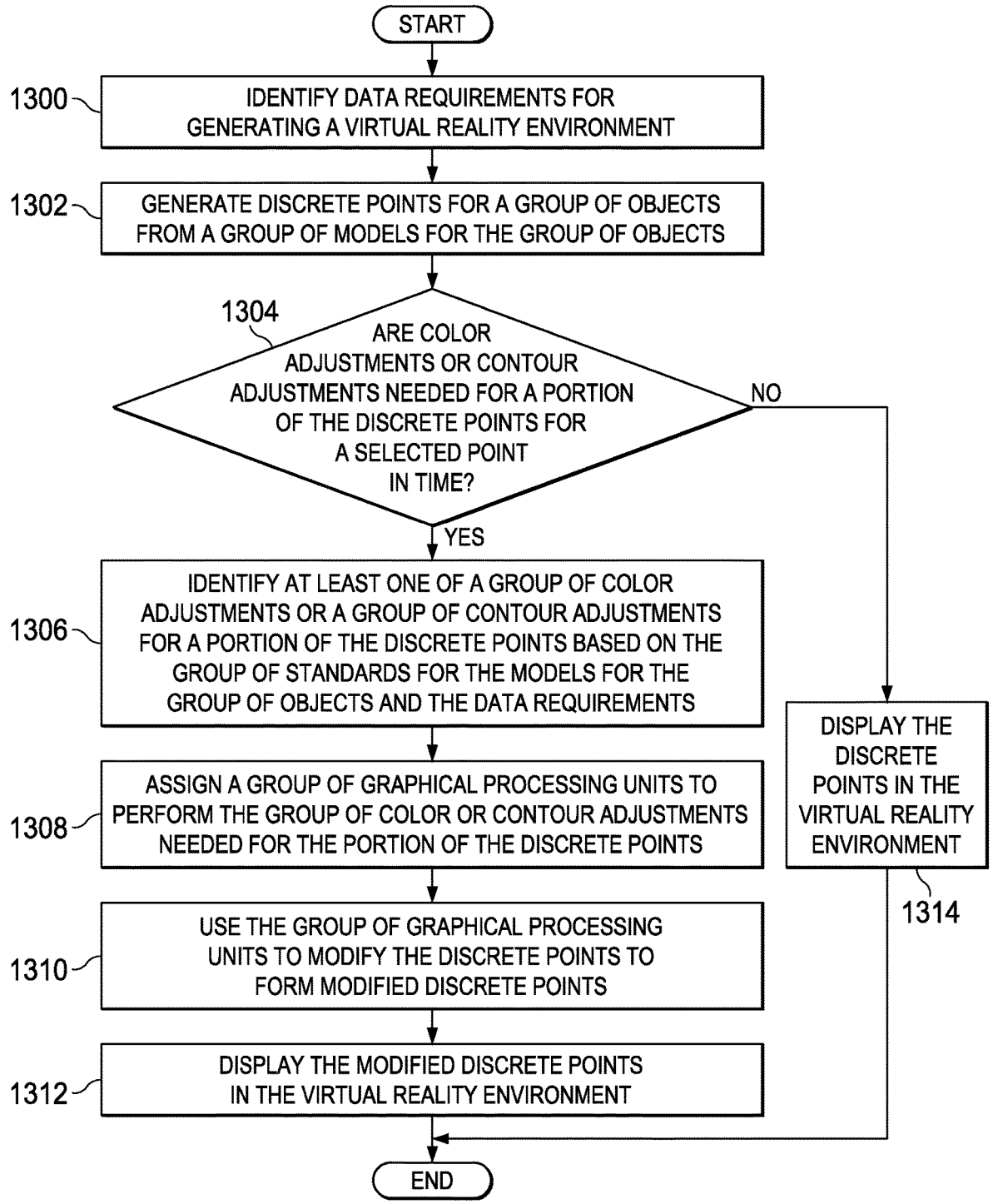
FIG. 13 is an illustration of a flowchart of a process for modifying the discrete points for a group of objects in accordance with an illustrative embodiment.

With reference next to FIG. 13, an illustration of a flowchart of a process for modifying the discrete points for a group of objects is depicted in accordance with an illustrative embodiment. The process illustrated in FIG. 13 may be implemented in training environment 100 in FIG. 1. In particular, the process may be implemented in virtual reality generator 114 in FIG. 1. Further, this process may be an example of one implementation of operation 1006 in FIG. 10.

The process begins by identifying data requirements for generating a virtual reality environment (operation 1300). The process generates discrete points for a group of objects from a group of models for the group of objects (operation 1302).

The process next determines if any color adjustments or contour adjustments are needed for a portion of the discrete points for a selected point in time (operation 1304). As depicted, when any color adjustments or contour adjustments are needed, the process next identifies at least one of a group of color adjustments or a group of contour adjustments for a portion of the discrete points based on the group of standards for the models for the group of objects and the data requirements (operation 1306).

The process continues by assigning a group of graphical processing units to perform the group of color or contour adjustments needed for the portion of the discrete points (operation 1308). The process uses the group of graphical processing units to modify the discrete points to form modified discrete points (operation 1310). The process then displays the modified discrete points in the virtual reality environment (operation 1312), with the process terminating thereafter.

When the process determines color adjustments or contour adjustments are not needed for a portion of the discrete points for the selected point in time, the process displays the discrete points in the virtual reality environment (operation 1314), with the process terminating thereafter. In other words, the process only modifies the discrete points when a group of color adjustments or a group of contour adjustments are needed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The illustration of virtual reality environment 900 in FIG. 9 is not meant to limit the manner in which graphical user interfaces may be implemented for receiving user input for data requirements. For example, other types of controls may be used such as sliders, dials, or other controls for selecting training session options. Further, other types of data requirements other than those depicted in training session options 902 also may be received as inputs. For example, a group of filters that define how to identify visible portions of a group of objects may be located in training session options 902. As another example, a group of surface types that define format of surfaces used for the group of objects may be located in training session options 902.

Figure 14:
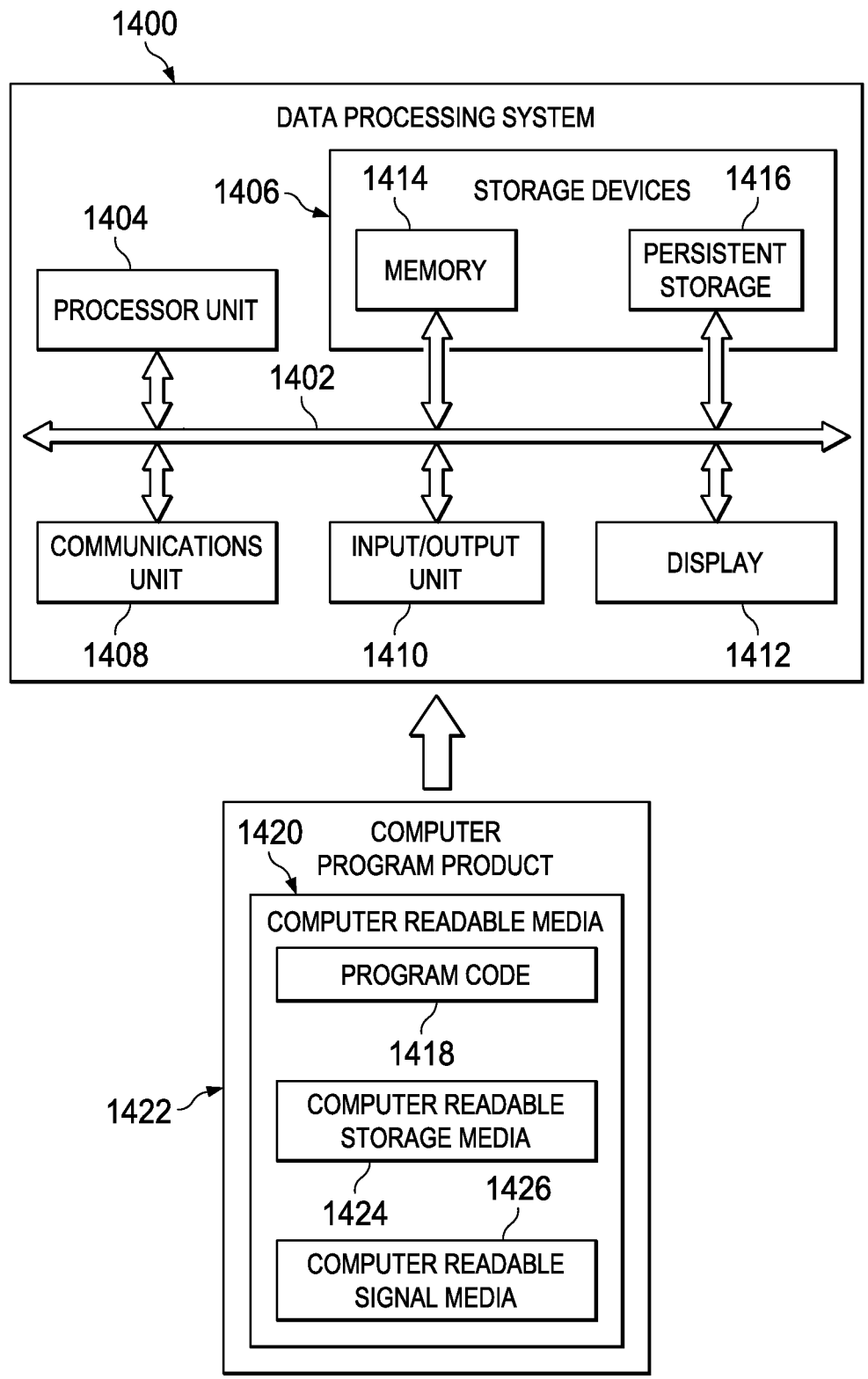
FIG. 14 is an illustration of a block diagram of a data processing system in accordance with an illustrative embodiment.

Turning now to FIG. 14, an illustration of a data processing system in the form of a block diagram is depicted in accordance with an illustrative embodiment. Data processing system 1400 may be used to implement one or more computers in computer system 110 in FIG. 1. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise at least one of a number of processors, a multi-processor core, or some other type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications, and/or programs run by processor unit 1404 may be located in storage devices 1406. Storage devices 1406 may be in communication with processor unit 1404 through communications framework 1402. As used herein, a storage device, also referred to as a computer readable storage device, is any piece of hardware capable of storing information on a temporary basis, permanent basis, or both. This information may include, but is not limited to, at least one of data, program code, or other type of information.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices. For example, persistent storage 1416 may comprise a hard drive, a flash memory, a rewritable optical disk, a rewritable magnetic tape, or some combination of the above. The media used by persistent storage 1416 may or may not be removable.

Communications unit 1408 allows data processing system 1400 to communicate with other data processing systems, devices, or both. Communications unit 1408 may provide communications using physical, wireless communications links, or both.

Input/output unit 1410 allows input to be received from and output to be sent to other devices connected to data processing system 1400. For example, input/output unit 1410 may allow user input to be received through a keyboard, a mouse, and/or some other type of input device. As another example, input/output unit 1410 may allow output to be sent to a printer connected to data processing system 1400.

Display 1412 is configured to display information to a user. Display 1412 may comprise, for example, without limitation, at least one of a monitor, a touch screen, a laser display, a holographic display, a virtual display device, or some other type of display device.

In this illustrative example, the processes of the different illustrative embodiments may be performed by processor unit 1404 using computer-implemented instructions. These instructions may be referred to as program code, computer usable program code, or computer readable program code and may be read and executed by one or more processors in processor unit 1404.

In these examples, program code 1418 is located in a functional form on computer readable media 1420, which is selectively removable, and may be loaded onto or transferred to data processing system 1400 for execution by processor unit 1404. Program code 1418 and computer readable media 1420 together form computer program product 1422. In this illustrative example, computer readable media 1420 may be computer readable storage media 1424 or computer readable signal media 1426.

Computer readable storage media 1424 is a physical or tangible storage device used to store program code 1418 rather than a medium that propagates or transmits program code 1418. Computer readable storage media 1424 may be, for example, without limitation, an optical or magnetic disk or a persistent storage device that is connected to data processing system 1400.

Alternatively, program code 1418 may be transferred to data processing system 1400 using computer readable signal media 1426. Computer readable signal media 1426 may be, for example, a propagated data signal containing program code 1418. This data signal may be an electromagnetic signal, an optical signal, and/or some other type of signal that can be transmitted over communications links.

The illustration of data processing system 1400 in FIG. 14 is not meant to provide architectural limitations to the manner in which the illustrative embodiments may be implemented. The different illustrative embodiments may be implemented in a data processing system that includes components in addition to or in place of those illustrated for data processing system 1400. Further, components shown in FIG. 14 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. For example, the illustrative examples may be applied to other situations other than training human operators.

For example, the different operations may be performed when making a presentation to a customer. With this example, changes to a virtual reality environment may be made based on customer input during a session with the customer. Also, the customer may desire to see how a different type of aircraft or vehicle may perform. With one or more illustrative embodiments, this change may be made during the same session in which the customers present viewing the presentation in a virtual reality environment. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating a virtual reality environment, the method comprising:

identifying data requirements for generating the virtual reality environment, wherein the virtual reality environment includes an object that is displayed on a display system using a group of computer aided design models defined by a group of standards, wherein the object comprises portions defined by continuous geometry;

generating discrete points for the object from the group of computer aided design models based on the data requirements for generating the virtual reality environment for a selected point in time;

using the discrete points to display the object on the display system;

selecting a minimum size, wherein the minimum size is a smallest visible portion of the object displayed on a surface of the object;

receiving a selection, from options displayed on the display system, comprising a group of color adjustments for a portion of the discrete points for the selected point in time while the object is displayed on the display system;

increasing a number of frames per second displayed in a training environment for the group of computer aided design models via modifying, in real time while the object is displayed on the display system, the discrete points using the group of color adjustments identified for forming modified discrete points; and using, while the object is displayed on the display system, the modified discrete points changing the display of the object on the display system.

2. The method of claim 1, further comprising:
increasing the number of frames per second displayed in the training environment for the group of computer aided design models to between 60 to 150 frames per second;
identifying a group of color processing scripts for processing the group of color adjustments needed; and
running the group of color processing scripts.

3. The method of claim 1 further comprising:
assigning a group of graphical processing units for performing the group of color adjustments needed for the portions of the discrete points.

4. The method of claim 3, wherein the group of graphical processing units is a first group of graphical processing units separate from a second group of graphical processing units, and wherein the step of identifying the data requirements for generating the virtual reality environment is performed by the second group of graphical processing units that does not include any of the first group of graphical processing units assigned to perform the group of color adjustments.

5. The method of claim 3, wherein the selected point in time is a first point in time in points in time, the group of color adjustments for the portion of the discrete points for the first point in time is of a first group of color adjustments needed for a first portion of first discrete points for the first point in time, the group of graphical processing units is a first group of graphical processing units assigned for performing the first group of color adjustments, and further comprising:
assigning a second group of graphical processing units to perform a second group of color adjustments needed for a second portion of second discrete points for a second point in time in the points in time.

6. The method of claim 3, wherein the group of graphical processing units includes a group of color processing modules.

7. The method of claim 1 further comprising:
identifying at least one of the group of color adjustments for the portions of the discrete points using the group of standards for the group of computer aided design models for the object and the data requirements by determining whether the group of color adjustments is needed for the portions of the discrete points for the selected point in time for the object using the group of computer aided design models for the object and the data requirements.

8. The method of claim 1, wherein the identifying, generating, and modifying steps are repeated over time based on a number of frames per second specified for the virtual reality environment in the data requirements.

9. The method of claim 1 further comprising:
receiving user input for the data requirements, wherein the data requirements include at least one of the number of frames per second, the object, a group of filters for identifying visible portions of the object, a group of surface types for the object, the minimum size for the visible portions of the object, or a color scale needed for the object.

10. The method of claim 1 further comprising:
storing the modified discrete points for the virtual reality environment in a three-dimensional format.

11. An apparatus that comprises a virtual reality generator within a computer system and configured to:
identify data requirements for generating a virtual reality environment, wherein the virtual reality environment includes an object that is displayed on a display system using a group of computer aided design models defined by a group of standards, and wherein the object comprises portions defined by continuous geometry;
generate discrete points for the object from the group of computer aided design models based on the data requirements for generating the virtual reality environment for a selected point in time;
use the discrete points to display the object on the display system;
display options for the object on the display system while the object is displayed on the display system;
select a minimum size, wherein the minimum size is a smallest visible portion of the object displayed on a surface of the object;
receive a selection, from options displayed on the display system, comprising a group of color adjustments for a portion of the discrete points for the selected point in time while the object is displayed on the display system;
increase a number of frames per second displayed in a training environment for the group of computer aided design models to modify via modifying, in real time while the object is displayed on the display system, the discrete points based on the group of color adjustments identified to form modified discrete points; and
use, while the object is displayed on the display system, the modified discrete points for displaying the object on the display system to thereby change the display of the object on the display system.

12. The apparatus of claim 11, wherein the virtual reality generator is further configured to:
increase the number of frames per second displayed in the training environment for the group of computer aided design models to between 60 to 150 frames per second; and modify the discrete points based on a group of scripts configured to process the group of color adjustments needed for the portions of the discrete points.

13. The apparatus of claim 11, wherein the virtual reality generator modifies the discrete points using a group of graphical processing units that perform the group of color adjustments needed for the portion of the discrete points.

14. The apparatus of claim 13, wherein the group of graphical processing units is a first group of graphical processing units, and wherein the virtual reality generator identifies the data requirements for generating the virtual reality environment using a second group of graphical processing units separate from the first group of graphical processing units.

15. The apparatus of claim 11, wherein the virtual reality generator identifies the group of color adjustments for the portions of the discrete points based on the group of standards for the group of computer aided design models for the object and the data requirements by determining whether the group of color adjustments is needed for the portions of the discrete points for the selected point in time for the object based on the group of computer aided design models for the object and the data requirements.

16. The apparatus of claim 11, wherein the virtual reality generator generates the discrete points for the object from the group of computer aided design models based on the data requirements for generating the virtual reality environment for selected points in time based on a number of frames per second specified for the virtual reality environment in the data requirements and identifies the group of color adjustments for the portions of the discrete points over time based on the group of standards for a group of computer aided design models of the object and the data requirements when the group of color adjustments is needed for the portions of the discrete points over time for the selected points in time.

17. The apparatus of claim 11, wherein in modifying the discrete points, the virtual reality generator identifies a group of color processing scripts for processing of the group of color adjustments needed and runs the group of color processing scripts.

18. The apparatus of claim 11, wherein the virtual reality generator assigns a group of graphical processing units to perform the group of color adjustments needed for the portions of the discrete points.

19. The apparatus of claim 18, wherein the group of graphical processing units includes a group of color processing modules.

20. The apparatus of claim 11, wherein the modified discrete points for the virtual reality environment are stored in a selected three-dimensional format.

\* \* \* \* \*